US00H002172H

(19) United States

(12) Statutory Invention Registration

Staelin et al.

(10) Reg. No.: US H2172 H

(43) Published: Sep. 5, 2006

(54) PITCH-SYNCHRONOUS SPEECH PROCESSING

(75) Inventors: David H. Staelin, Wellesley, MA (US); Carlos R. Cabrera-Mercader, Somerville, MA (US)

(73) Assignee: The United States of America as represented by the Secretary of the Air Force, Washington, DC (US)

(21) Appl. No.: 10/186,605

(22) Filed: Jul. 2, 2002

(51) Int. Cl.
*G10L 15/00* (2006.01)

(52) U.S. Cl. ..... 704/207

(58) Field of Classification Search ..... 704/207, 704/208, 223, 231, 233, 268, 278; 395/2.28
See application file for complete search history.

(56) References Cited

U.S. PATENT DOCUMENTS 4,885,790 A * 12/1989 McAulay et al. ..... 704/265
5,008,941 A 4/1991 Sejnoha
5,023,910 A * 6/1991 Thomson ..... 704/206
5,148,489 A 9/1992 Erell
5,377,301 A 12/1994 Rosenberg
5,469,529 A 11/1995 Bimbot et al.
5,548,680 A * 8/1996 Cellario ..... 704/219
5,598,505 A * 1/1997 Austin et al. ..... 704/226
5,727,124 A 3/1998 Lee et al.
5,745,872 A 4/1998 Sonmez et al.
5,768,474 A 6/1998 Neti
5,832,437 A * 11/1998 Nishiguchi et al. ..... 704/268
5,924,065 A * 7/1999 Eberman et al. ..... 704/231
5,933,808 A * 8/1999 Kang et al. ..... 704/278
6,029,133 A * 2/2000 Wei ..... 704/265
6,059,062 A 5/2000 Stadin
6,418,408 B1 * 7/2002 Udaya Bhaskar et al. .. 704/219
6,463,406 B1 * 10/2002 McCree ..... 704/207
6,678,655 B1 * 1/2004 Hoory et al. ..... 704/223
6,871,176 B1 * 3/2005 Choi et al. ..... 704/223
6,885,986 B1 * 4/2005 Gigi ..... 704/207

* cited by examiner

*Primary Examiner*—Daniel Pihulic
(74) *Attorney, Agent, or Firm*—William G. Auton

(57) ABSTRACT

Pitch-synchronous speech processing invention involves two main steps: 1) divide the speech into pitch periods, or into pseudo pitch periods for unvoiced speech, where the breaks occur, for example, at the first zero-crossing preceding each glottal pulse for voiced speech and at any arbitrary point for unvoiced speech, and 2) compute the log-magnitude of the Discrete Fourier Transform (DFT) of each pitch-period waveform, and interpolate each log-magnitude spectrum to a common regular grid which can accommodate the spectrum of a waveform having the longest pitch period anticipated.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PITCH-SYNCHRONOUS SPEECH PROCESSING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to synthetic speech systems and more specifically to a pitch synchronous method of transforming speech into vectors for speech processing.

Signal processing for speech, speaker, or language recognition, or for other speech applications, generally consists of a pre-processing step that reduces the speech to a series of vectors, on per time interval, where that interval is typically chosen to lie between five and twenty msec, and successive intervals may overlap. The most commonly used vector representation is the mel cepstrum, which is the Discrete Fourier Transform (DFT) of the logarithm of the non-uniformly low-pass filtered sampled magnitude of the spectrum of that speech segment. The non-uniform filtering and sampling provide roughly constant Q for each channel. A typical output vector might have twenty-eight scalar elements.

The task of processing speech into preprocessing vectors is alleviated, to some extent, by the systems disclosed in the following U.S. Patent, the disclosures of which are incorporated herein by reference:

U.S. Pat. No. 5,008,941 issued to Sejnoha

U.S. Pat. No. 5,148,489 issued to Erell et al

U.S. Pat. No. 5,337,301 issued to Rosenberg et al

U.S. Pat. No. 5,469,529 issued to Bimbot et al

U.S. Pat. No. 5,598,505 issued to Austin et al

U.S. Pat. No. 5,727,124 issued to Lee et al

U.S. Pat. No. 5,745,872 issued to Sonmez et al

U.S. Pat. No. 5,768,474 issued to Neti

U.S. Pat. No. 5,924,065 issued to Eberman

U.S. Pat. No. 6,059,602 issued to Stadin

The Stadin is interesting as it is for a powered roller skating system using speech recognition sensors and synthesized speech data processing.

The best reference is the Eberman patent which shows a computerized speech processing system with speech signals stored in a vector codebook and processed to produce corrected vectors.

Generally, speech processing includes the following steps. In a first step, digitized speech signals are partitioned into time-aligned portions (frames) where acoustic features can generally be represented by linear predictive coefficient (LPC) "feature" vectors. In a second step, the vectors can be cleaned up using environmental acoustic data. That is, processes are applied to the vectors representing dirty speech signals so that a substantial amount of the noise and distortion is removed. The cleaned-up vectors, using statistical comparison methods, more closely resemble similar speech produced in a clean environment. Then in a third step, the cleaned feature vectors can be presented to a speech processing engine which determines how the speech is going to be used. Typically, the processing relies on the use of statistical models or neural networks to analyze and identify speech signal patterns.

In an alternative approach, the feature vectors remain dirty. Instead, the pre-stored statistical models or networks which will be used to process the speech are modified to resemble the characteristics of the feature vectors of dirty speech. This way a mismatch between clean and dirty speech, or their representative feature vectors can be reduced.

By applying the compensation on the processes (or speech processing engines) themselves, instead on the data, i.e., the feature vectors, the speech analysis can be configured to solve a generalized maximum likelihood problem where the maximization is over both the speech signals and the environmental parameters.

The present invention is an alternate method and means for performing this first step of transforming speech into a standard series of vectors where each vector represents the sampled magnitude of the spectrum of one pitch period for voiced speech or one pseudo pitch period for unvoiced speech. The subsequent speech processing steps can then be performed with these new vectors as inputs.

SUMMARY OF THE INVENTION

The present invention is an alternate method and means for performing the first step of transforming speech into a standard series of vectors where each vector represents the sampled magnitude of the spectrum of one pitch period for voiced speech or one pseudo pitch period for unvoiced speech. The subsequent speech processing steps can then be performed with these new vectors as inputs, provided these subsequent steps are adapted to the new vectors with suitable training protocols and data.

The invention involves two main steps:

1. divide the speech into pitch periods, or into pseudo pitch periods for unvoiced speech, where the breaks occur, for example, at the first zero-crossing preceding each glottal pulse for voiced speech and at any arbitrary point for unvoiced speech, and
2. compute the log-magnitude of the Discrete Fourier Transform (DFT) of each pitch-period waveform, and interpolate each log-magnitude spectrum to a common regular grid which can accommodate the spectrum of a waveform having the longest pitch period anticipated.

DESCRIPTION OF THE PREFERRED EMBODIMENT

The present invention is a speech processing system and process for transforming speech into a standard series of vectors where each vector represents the sampled magnitude of the spectrum of one pitch period for voiced speech or one pseudo pitch period for unvoiced speech. The subsequent speech processing steps can then be performed with these new vectors as inputs, provided these subsequent steps are adapted to the new vectors with suitable training protocols and data. A block diagram of the proposed process is illustrated in FIG. 1.

Figure 1:
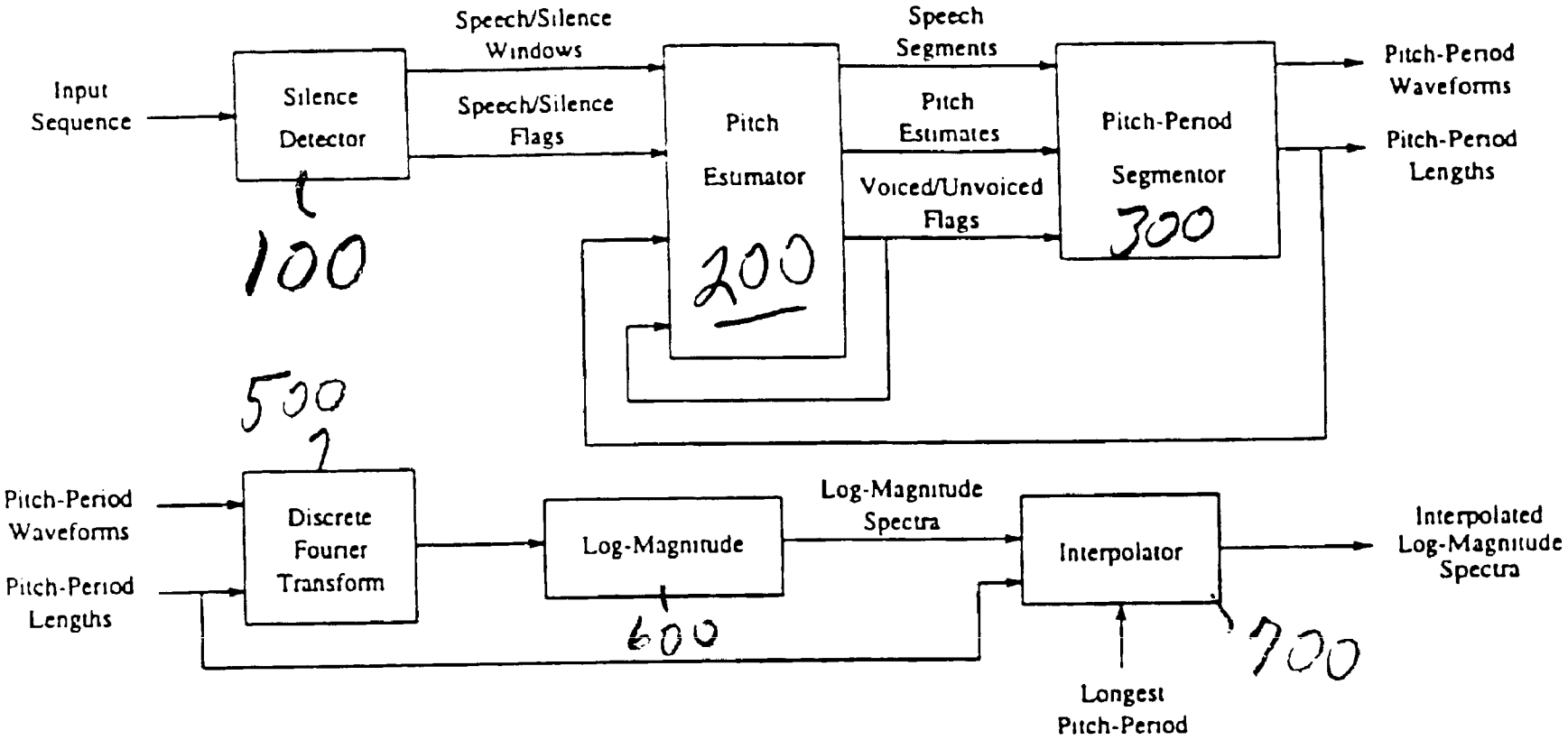
FIG. 1 is an illustration of a complete speech preprocessing system of the present invention.

The process of FIG. 1 has two main steps:

1. divide the speech into pitch periods, or into pseudo pitch periods for unvoiced speech, where the breaks occur, for example, at the first zero-crossing preceding each glottal pulse for voiced speech and at any arbitrary point for unvoiced speech, and 2. compute the log-magnitude of the Discrete Fourier Transform (DFT) of each pitch-period waveform, and interpolate each log-magnitude spectrum to a common regular grid which can accommodate the spectrum of a waveform having the longest pitch period anticipated.

The process of FIG. 1 begins as acoustic data is processed for silence detection 100 to determine which part of the data stream has speech or silence. The speech sequence is converted into a stream of windows of LW speech samples each. The length LW should be comparable to the duration of a syllable. A given window is said to contain speech if its average power exceeds a suitably chosen threshold POW_TH and is otherwise classified as silence, e.g. POW_TH may equal the noise variance per sample.

Once the portion of the data stream containing speech is flagged the pitch estimator 200 can process the flagged data stream.

Figure 2:
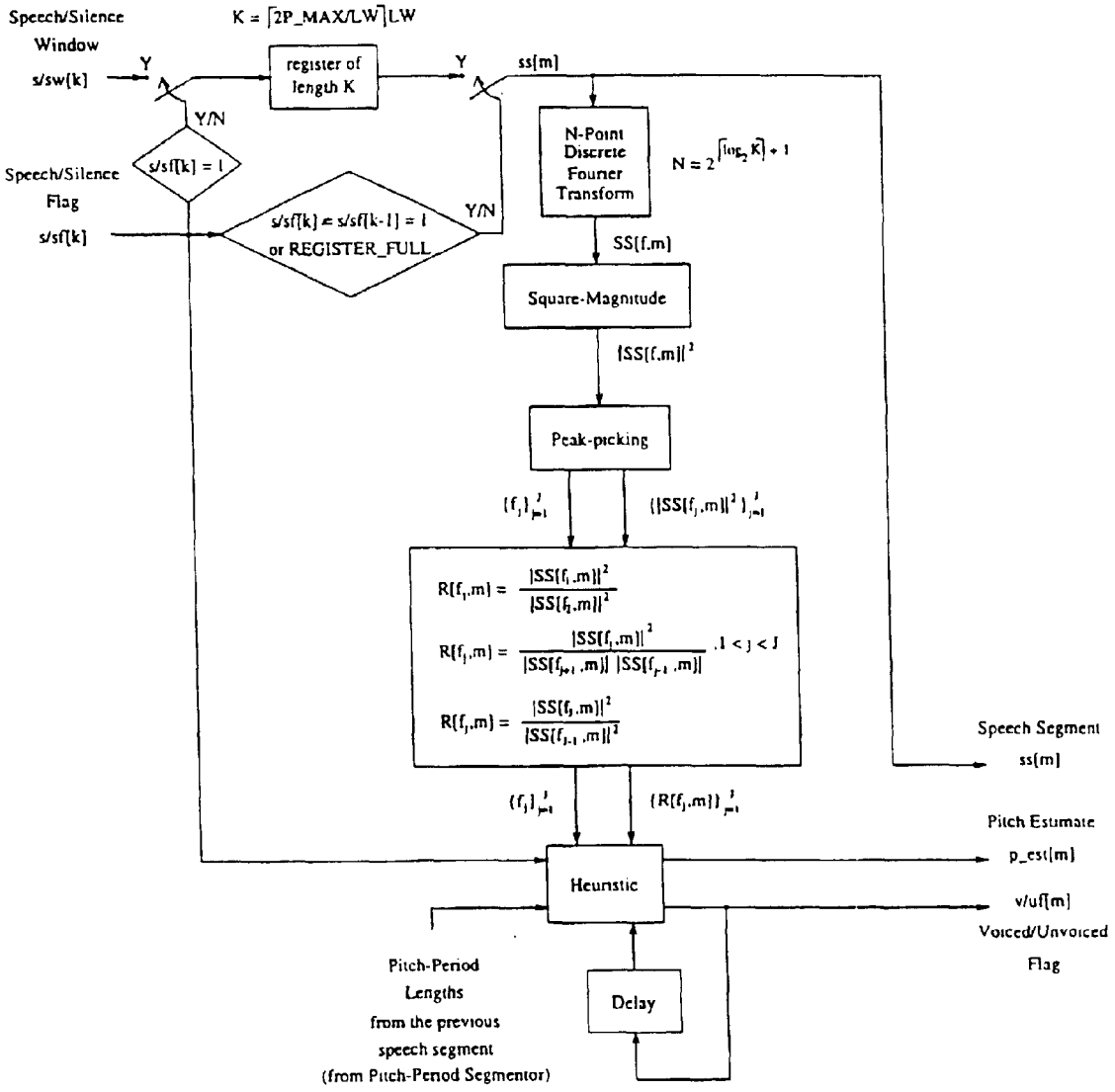
FIG. 2 is a diagram of the pitch estimation component.

The pitch estimation component is illustrated in FIG. 2. The input data used to estimate the pitch is the stream of classified speech/silence windows, and the minimum and maximum anticipated pitch period, P_MIN and P_MAX respectively. A register of length $K=\lceil 2P_MAX/LW \rceil LW^1$ is sequentially filled with samples from a contiguous sequence of windows containing speech until the capacity of the buffer is reached or a silence window is found on the input stream. Then the following operations are performed on the retrieved speech segment:

1. The N-point DFT of the speech segment is computed with $$N = 2^{\left\lceil \frac{\log K}{2} \right\rceil + 1}$$

and the square-magnitude of each transform coefficient is computed to yield a power spectrum.

2. The frequencies at which the power spectrum has local maxima are determined.
3. A locally normalized spectral envelope is computed by dividing the value of the power spectrum at each peak by the geometric mean of the two adjacent peaks. For the first and last peaks the power spectrum is normalized by the value of the single adjacent peak.
4. If there are no frequencies at which the normalized spectral envelope is greater than ten, the speech segment is declared to be unvoiced; otherwise it is declared to be voiced.
5. For unvoiced speech segments the pitch is set to the default pitch P_DEF.
6. For voiced speech segments a primary pitch estimate is extracted from the normalized spectral envelope using the following heuristic. If there are fewer than five normalized spectral peaks which exceed a threshold of ten, then the lowest frequency in that set of spectral values yields the primary pitch estimate. Alternatively, if there are five or more normalized spectral peaks greater than ten, one first finds the maximum normalized spectral peak from the set of frequencies which are lower than the lowest frequency satisfying the threshold condition. If such a maximum exists and is greater than five and occurs at a frequency which is within twenty percent of half the lower frequency at which the normalized spectrum is greater than ten, then the lower of the two frequencies gives the primary pitch estimate, otherwise the higher of the two frequencies is used as the primary pitch estimate.
7. If the current and previous speech segments are not separated by silence and they were both declared as voiced, a secondary pitch estimate for the current segment is computed. First the means and standard deviation of the ensemble of pitch period lengths of the previous speech segment are computed. If the standard deviation is less than ten percent of the mean and the mean is less than P_MAX, then the mean pitch period length for the previous segment is used as the secondary pitch estimate for the current speech segment.
8. The final pitch estimate p_est for voiced speech segments is obtained as follows. If only the primary pitch estimate is available, it is used as the final estimate. When the secondary pitch estimate is also available the ratio of the primary estimate to the secondary estimate determines which of the two estimates is used as the final estimate. If the ratio is less than 1.3 and greater than 0.7, the primary estimate is used; otherwise the secondary estimate is used.

The speech segments are segmented further into pitch periods as follows.

1. If the current speech segment is starting and the current and previous speech segments are separated by silence, find the maximum peak of the speech waveform in the time interval of duration P_MAX starting at the beginning of the current speech segment. Otherwise, find the maximum peak within the time interval starting 0.7*p_est time units ahead of the last located peak and ending 1.3*p_est time units ahead of the last located peak. Let s_max and t_max be the value and the time index of the located maximum, respectively.
2. Find the minimum value of the speech waveform in the time interval of duration p_est/2 ending at t_max. Let s_ min be the value of the located minimum.
3. Position the time cursor at t_max.
4. Move back along the time axis until a peak is found which lies above a line of slope 0.5*(s_max−s_min)/p_est passing through the current peak and is contained in the time interval of length 0.3*p_est ending at t_max.
5. Repeat step 4 until another peak satisfying the specified conditions is not found. Let t_p be the time index of the last located peak.
6. If the current speech segment is declared as unvoiced, the start of the current pseudo pitch period is the minimum of t_p and the start of the previous pitch period (pseudo pitch period) plus P_MAX if there is a preceding pitch period (pseudo pitch period), or the maximum of t_p and the start of the current speech segment if the current pseudo pitch period is the first one in the current speech segment if the current pseudo pitch period is the first one in the current speech segment and the current and previous speech segments are separated by silence.

TABLE 1 parameter values used to generate the example discussed below. The symbol [*] denotes rounding to the nearest integer. The sampling rate was F_s = 48000 samples sec.

| Parameter | Value |
|---|---|
| POW_TH | 1000 |
| LW | [16 * F_s/1000] |
| P_MIN | [1.4 * F_s/1000] |
| P_MAX | [25 * F_s/1000] |
| P_DEF | [6 * F_s/1000] |

7. If the current speech segment is declared as voiced the following rules are used to determine the start of the current pitch period.
   (a) If the current and previous speech segments are separated by silence and the current pitch period is the first one in the current speech segment, the start of the current pitch period is the maximum of the zero-crossing preceding t_p and the start of the current speech segment. If there is no zero-crossing, the start of the current pitch period is the start of the current speech segment.
   (b) If the current and previous speech segments are adjacent in time and there is a zero-crossing between t_p and the start of the previous pitch period, the start of the current pitch period is the minimum of trhe zero-crossing immediately preceding t_p and the start of the previous pitch period plus P_MAX. If there is no zero-crossing between t_p and the start of the previous pitch period, the start of the current pitch period is the start of the previous pitch period plus p_est.

Figure 3:
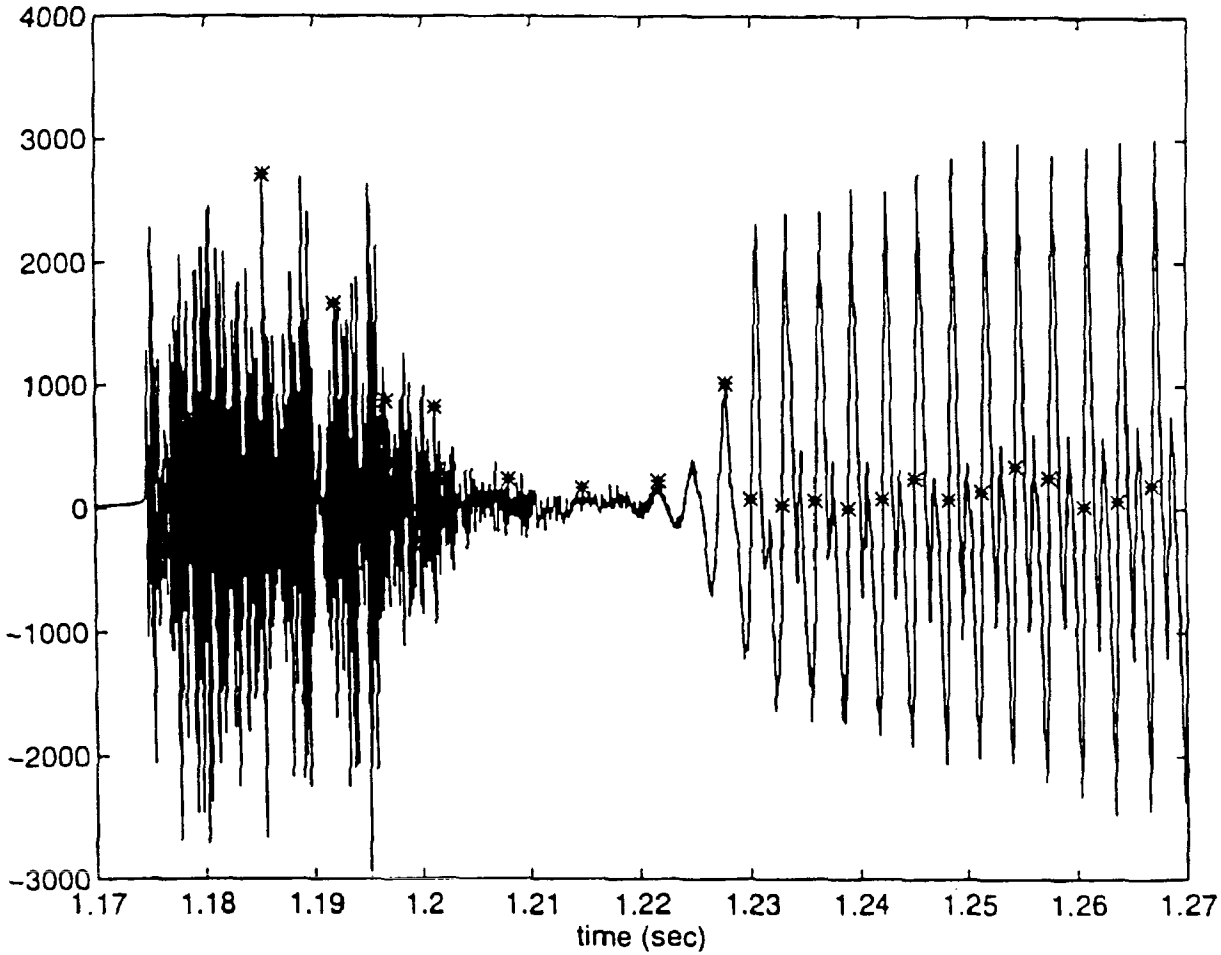
FIG. 3 is a diagram of the output of the pitch period segmentor of the present invention.

This procedure is repeated until the end of the current speech segment is reached. FIG. 3 shows the segmentation into pitch periods and pseudo pitch periods of a speech segment 100 msec long, where the breaks are indicated by asterisks.

For each pitch period or pseudo pitch period the N-point DFT is computed with N equal to the length of the period in question and the log-magnitude of each transform coefficient is computed. Finally, each log-magnitude spectrum is linearly interpolated to a common regular grid with frequency resolution 1/P_MAX.

One example of the invention illustrated the pitch-synchronous spectral representation of the sentence "The little blankets lay around on the floor." as delivered by a female speaker. The speech was sampled at a rate of F_s= 48000 samples/sec with 16-bit resolution. The values of the parameters used to generate this example are listed in Table 1.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A pitch-synchronous speech processing method for converting an acoustic data stream that contains periods of speech and periods of silence into a series of vectors that constitute a vector representation of the speech the proves comprising the steps of:

dividing the speech into pitch periods, or into pseudo pitch periods for unvoiced speed, where breaks occur, for example, at a first zero-crossing preceding each glottal pulse for voiced speech and at any arbitrary point for unvoiced speech, and computing log-magnitude of the Discrete Fourier Transform (DFT) of each pitch-period waveform, and interpolate each log-magnitude spectrum to a common regular grid which can accommodate a spectrum of a waveform have a pitch period.

2. A method as defined in claim 1, wherein said dividing step further comprises:

a silence detection subset in which periods of speech in the acoustic data stream are flagged with a speech identifier flag, and wherein the periods of silence in the acoustic data stream are flagged with a silence identifier flag.

3. A method as defined in claim 2, wherein said dividing step further comprises a pitch estimation substep in which samples of the acoustic data stream are taken and used to estimate pitch in the periods of speech identified with a speech identifier flag, and not in the periods of silence identified by a silence identifier flag, the pitch estimation substep outputting thereby a set of pitch estimates.

4. A method as defined in claim 3, wherein said dividing step further comprises a pitch period segmentor substep in which the acoustic data stream, pitch estimate, speech identifier flags and silence identifier flagger are used to compute measurements of pitch period lengths and pitch period waveforms in the acoustic data stream.

5. A method as identified in claim 4, wherein said computing step further comprises:

a Fourier transform substep which produces output signals by performing Fourier transforms on the pitch period waveforms and outputting said Fourier transforms and pitch period lengths.

6. A method as defined in claim 5 wherein said computing step further comprises:

a log-magnitude computing step which operates on the output signals of the Fourier transform substep to output thereby a log-magnitude spectra of the acoustic data stream.

7. A method as defined in claim 6 wherein said computing step further comprises and interpolator substep which produces an output by interpolating the log-magnitude spectra of the acoustic data stream with the pitch period lengths of the acoustic data stream, the output signals of the interpolator step being the series of vectors of the acoustic data thereon defined as a set of interpolated log-magnitude spectra values.

* * * * *